(12) United States Patent
Yin et al.

(10) Patent No.: US 12,706,681 B2
(45) Date of Patent: Aug. 11, 2026

(54) DEVICES, METHODS, APPARATUSES AND MEDIA FOR COMMUNICATION

(71) Applicant: Nokia Solutions and Networks Oy, Espoo (FI)

(72) Inventors: Qin Yin, Shanghai (CN); Yi Zhang, Shanghai (CN); Cong Wang, Shanghai (CN); Cheng Bing Li, Shanghai (CN); Song He, Shanghai (CN); Hai Jun Lu, Shanghai (CN)

(73) Assignee: Nokia Solutions and Networks Oy, Espoo (FI)

(*) Notice: Subject to any disclaimer, the term of this patent is extended or adjusted under 35 U.S.C. 154(b) by 273 days.

(21) Appl. No.: 18/422,521

(22) Filed: Jan. 25, 2024

(65) Prior Publication Data

US 2024/0259110 A1 Aug. 1, 2024

(30) Foreign Application Priority Data

Jan. 28, 2023 (CN) ......................... 202310087860.2

(51) Int. Cl.
*H04B 10/85* (2013.01)
*H04Q 11/00* (2006.01)

(52) U.S. Cl.
CPC ......... *H04B 10/85* (2013.01); *H04Q 11/0067* (2013.01); *H04Q 2011/0079* (2013.01)

(58) Field of Classification Search
None
See application file for complete search history.

(56) References Cited

FOREIGN PATENT DOCUMENTS

| | | | | |
|---|---|---|---|---|
| CN | 103166791 A | * 6/2013 | ......... | H04L 41/5054 |
| CN | 103 166 791 B | 8/2018 | | |

OTHER PUBLICATIONS

Carey Tim et al: 11TR-451 vOMCI Specification, Jun. 1, 2022 (Jun. 1, 2022), pp. 1-113, XP093005109, Retrieved from the Internet: URL:https://www.broadband-forum.org/technical/download/TR-451.pdf [retrieved on Dec. 5, 2022].

Search Report for European Application No. 24153813.1 dated Jun. 28, 2024.

* cited by examiner

*Primary Examiner* — David W Lambert
(74) *Attorney, Agent, or Firm* — Nokia Technologies Oy

(57) ABSTRACT

Embodiments of the present disclosure relate to devices, methods, apparatuses and media for communication. A device for communication is configured to generate target data for the optical network unit based on template data for an optical network unit set and instance data for an optical network unit in the optical network unit set. The device is further configured to perform validation on the target data of the optical network unit. In this way, an optical network unit data validation solution that supports an optical network unit to use template data is provided, which can significantly improve the validation speed of optical network unit data.

15 Claims, 12 Drawing Sheets

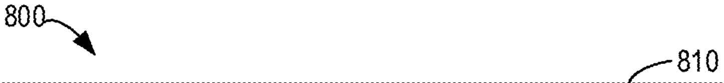

receiving a first message from a first device, wherein the first message indicates whether the first device supports generating target configuration data for an optical network unit in the optical network unit set based on template data for an optical network unit set

820 sending a second message to the first device based on determining that the first message indicates the first device supports generating the target configuration data based on the template data, wherein the second message comprises the template data, the instance data, and identification information for identifying the template data

Fig. 8

DEVICES, METHODS, APPARATUSES AND MEDIA FOR COMMUNICATION

CROSS-REFERENCE TO RELATED APPLICATIONS

This application claims priority to and the benefit of Chinese Patent Application No. 202310087860.2 filed on Jan. 28, 2023, the entire contents of each of which are incorporated herein by reference.

FIELD

Embodiments of the present disclosure generally relate to the field of communication, and more specifically, to devices, methods, apparatuses and computer-readable media for communication.

BACKGROUND

In a Passive Optical Network (PON) access Software Defined Network (SDN) solution, an Optical Network Unit (ONU) management application (e.g. an ONU Management Control Interface (OMCI) function) could be decoupled from the Optical Line Terminal (OLT) device and run in a cloud virtualizer in cloud as micro service. This gives possibility and flexibility for different vendors to offer their own ONU management applications to manage their ONUs without binding to the OLT device, which increases significantly the Input Output Operation (IOP) capability.

A virtualized OMCI in the Broad Band Forum (BBF)/SDN standards is now a hot research topic, and there arises a need for further studying real deployment of the virtualized OMCI and the POC related SDN solution.

SUMMARY

In general, embodiments of the present disclosure relate to devices, methods, apparatuses, and computer-readable media for communication.

In a first aspect, embodiments of the present disclosure provide a device for communication. The device includes: at least one processor; and at least one memory, where the at least one memory storing instructions that, when executed, causing the device at least to: generate, based on template data for an optical network unit set and instance data for an optical network unit in the optical network unit set, target data for the optical network unit; and perform validation on the target data of the optical network unit.

In a second aspect, embodiments of the present disclosure provide a first device for communication. The first device includes: at least one processor; and at least one memory, where the at least one memory storing instructions that, when executed, causing the first device at least to: receive, from a second device, template data for an optical network unit set and instance data for an optical network unit in the optical network unit set; and generate, at least based on the template data and the instance data, target configuration data for the optical network unit, where the target configuration data correspond to target data generated from the template data and the instance data.

In a third aspect, embodiments of the present disclosure provide a second device for communication. The second device includes: at least one processor; and at least one memory, where the at least one memory storing instructions that, when executed, causing the second device at least to: receive a first message from a first device, where the first message indicates whether the first device supports generating target configuration data for an optical network unit in an optical network unit set based on template data for the optical network unit set, where the target configuration data corresponding to target data generated from the template data and instance data for the optical network unit; and send a second message to the first device based on determining that the first message indicates the first device supports generating the target configuration data based on the template data, where the second message comprises the template data, the instance data, and identification information for identifying the template data.

In a fourth aspect, embodiments of the present disclosure provide a method for communication. The method includes: generating, based on template data for an optical network unit set and instance data for an optical network unit in the optical network unit set, target data for the optical network unit; and performing validation on the target data of the optical network unit.

In a fifth aspect, embodiments of the present disclosure provide a method for communication. The method includes: at a first device, receiving, from a second device, template data for an optical network unit set and instance data for an optical network unit in the optical network unit set; and generating, at least based on the template data and the instance data, target configuration data for the optical network unit, where the target configuration data correspond to target data generated from the template data and the instance data.

In a sixth aspect, embodiments of the present disclosure provide a method for communication. The method includes: at a second device, receiving a first message from a first device, where the first message indicates whether the first device supports generating target configuration data for an optical network unit in an optical network unit set based on template data for the optical network unit set, where the target configuration data correspond to target data generated from the template data and instance data for the optical network unit; and sending a second message to the first device based on determining that the first message indicates the first device supports generating the target configuration data based on the template data, where the second message includes the template data, the instance data, and identification information for identifying the template data.

In a seventh aspect, embodiments of the present disclosure provide an apparatus for communication. The apparatus includes means performing operations of: receiving, from a second device, template data for an optical network unit set and instance data for an optical network unit in the optical network unit set; and generating, at least based on the template data and the instance data, target configuration data for the optical network unit, where the target configuration data correspond to target data generated from the template data and the instance data.

In an eighth aspect, embodiments of the present disclosure provide an apparatus for communication. The apparatus includes means performing operations of: receiving, from an optical network unit, a plurality of light signals differing in wavelength, each of the plurality of optical signals carrying indication information that is used to indicate a wavelength sequential number of the optical signal and temperature information of a laser chip when generating the optical signal; performing coherence detection on the plurality of optical signals, to determine a target optical signal successfully detected by the optical line terminal in the plurality of optical signals; generating, based on the target optical signal and a local oscillator optical signal of the optical line terminal, temperature adjustment information used for the laser chip of the optical network unit; and sending the temperature adjustment information to the optical network unit.

In a ninth aspect, embodiments of the present disclosure provide an apparatus for communication. The apparatus includes means performing operations of: receiving a first message from a first device, where the first message indicates whether the first device supports generating target configuration data for an optical network unit in the optical network unit set based on template data for an optical network unit set, where the target configuration data correspond to target data generated from the template data and instance data for the optical network unit; and sending a second message to the first device based on determining that the first message indicates the first device supports generating the target configuration data based on the template data, where the second message comprises the template data, the instance data, and identification information for identifying the template data.

In a tenth aspect, embodiments of the present disclosure provide a computer-readable storage medium. The computer-readable storage medium includes program instructions that cause, when executed by an apparatus, the apparatus to perform any method according to the fourth, fifth or sixth aspect.

In an eleventh aspect, embodiments of the present disclosure provide a computer program. The computer program includes instructions that cause, when executed by an apparatus, the apparatus to perform any method according to the fourth, fifth or sixth aspect.

In a twelfth aspect, embodiments of the present disclosure provide a device for communication. The device includes a generation circuit configured to generate, based on template data for an optical network unit set and instance data for an optical network unit in the optical network unit set, target data for the optical network unit. The optical network unit further includes a validation circuit configured to perform validation on the target data of the optical network unit.

In a thirteenth aspect, embodiments of the present disclosure provide a first device for communication. The first device includes a receiving device configured to receive, from a second device, template data for an optical network unit set and instance data for an optical network unit in the optical network unit set. The first device further includes a generation circuit configured to generate, at least based on the template data and the instance data, target configuration data for the optical network unit, where the target configuration data correspond to target data generated from the template data and the instance data.

In a fourteenth aspect, embodiments of the present disclosure provide a second device for communication. The second device includes a receiving circuit configured to receive a first message from a first device, where the first message indicates whether the first device supports generating target configuration data for an optical network unit in an optical network unit set based on template data for the optical network unit set, where the target configuration data correspond to target data generated from the template data and instance data for the optical network unit. The second device further comprises a sending circuit configured to send a second message to the first device, based on determining that the first message indicates the first device supports generating the target configuration data based on the template data, where the second message includes the template data, the instance data, and identification information for identifying the template data.

It would be appreciated that this summary is not intended to identify key features or essential features of the subject matter as described herein, nor is it intended to be used to limit the scope of the subject matter as described herein. Other features of the present disclosure will become evident through the following description.

BRIEF DESCRIPTION OF THE DRAWINGS

The above and other objectives, features, and advantages of the present disclosure will become more apparent, through the following detailed description of the example embodiments with reference to the accompanying drawings. In the drawings, the same or similar reference symbols refer to the same or similar components, where:

FIG. 8 illustrates a flowchart of an ONU configuration data calculation method implemented at a second device according to some embodiments of the present disclosure;

Throughout the drawings, the same or similar reference symbols refer to the same or similar components.

DETAILED DESCRIPTION OF EMBODIMENTS

Figure 1A:
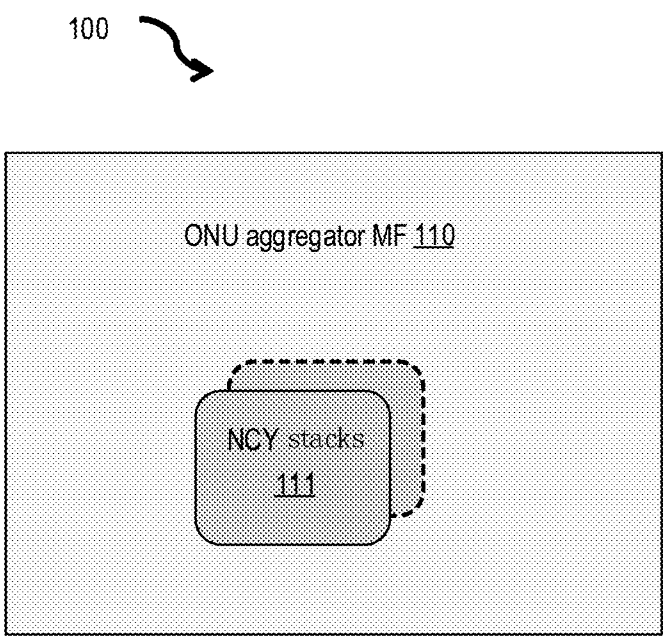
FIG. 1A illustrates a schematic diagram of an ONU aggregator according to some embodiments of the present disclosure.

Reference now will be made to various example embodiments as shown in the drawings to describe the principle and spirit of the present disclosure. It would be appreciated that the description on those embodiments is provided merely to enable those skilled in the art to better understand and thus implement the present disclosure, rather than suggesting any limitations to the scope of the present disclosure.

As used herein, the term “includes” and similar expressions are to be read as open terms that mean “includes, but is not limited to”. The term “based on” is to be read as “based at least in part on”. The term “an embodiment” or "the embodiment" is to be read as "at least one embodiment". The terms "first," "second" and the like may refer to the same or different objects. Other definitions, explicit or implicit, may be included below.

The term "determine/determining" encompasses a wide variety of actions and, therefore, can include calculating, computing, processing, deriving, investigating, looking up (e.g., looking up in a table, a database or another data structure), ascertaining and the like. Further, "determining" can include receiving (e.g., receiving information), accessing (e.g., accessing data in a memory) and the like. In addition, "determine/determining" can include resolving, selecting, choosing, establishing and the like.

As used herein, the term "circuitry" can refer to one or more of the following: (a) hardware-only circuitry implementations, such as implementations in only analog and/or digital circuitry; and (b) combinations of hardware circuits and software, such as (as applicable): (i) a combination of analog and/or digital hardware circuit(s) with software/firmware and (ii) any portion of hardware processor(s) with software (including digital signal processor(s), software, and memory(ies) that work together to cause an apparatus, such as an optical receiver or other computing device, to perform various functions); and (c) hardware circuit(s) and/or processor(s), such as a microprocessor(s) or a portion of a microprocessor(s), that require software (e.g. firmware) for operation, but the software might not be present when it is not needed for operation.

This definition of "circuitry" applies to all uses of this term in this disclosure, including in any claims. As a further example, as used herein, the term "circuitry" would also cover an implementation of merely a hardware circuit or processor and its (or their) accompanying software and/or firmware. The term "circuitry" also covers, for example and if applicable to the particular claim element, a baseband integrated circuit, or a processor integrated circuit, or an OLT or ONU or a similar integrated circuit in other computing device.

As used herein, the terms "optical network", "optical communication network", "passive optical network" and "PON" refer to that an Optical Distribution Network (ODN) included therein is formed by passive parts such as an optical splitter, optical fiber and the like, without any active devices, which includes, but is not limited to, a Gigabit-Capable Passive Optical Network (GPON), 10 Gigabit-Capable Passive Optical Network (XG-PON), 10-Gigabit-Capable Symmetric Passive Optical Network (XGS-PON), Next Generation Passive Optical Network (NG-PON) and other optical communication network currently known or to be developed in the future.

As used herein, the term "optical line terminal" or "OLT" refers to a device that acts as a service providing node to provide service to a terminal user. OLT may provide, for example, an electro-optical conversion function, to send a signal via an optical fiber.

As used herein, the term "optical network unit" or "ONU" refers to a client node connected with an OLT via an optical fiber to receive user data from the OLT.

In a PON, there are massive ONU devices, normally required to reach hundreds of thousands per network virtualizer. BBF is working on another next generation (YANG) model of the ONU template, to reduce configuration data for ONU. Such template provides a general solution to contain common data shared across ONUs, and put ONU instance specific data in the YANG instance. In the case, the ONU configuration data size is significantly decreased.

The template concept in a network configuration YANG (NCY) stack is mentioned in RFC8342 (e.g. Network Management Data Storage Architecture (NMDA)), but there is no description of how to define/use/implement it. So till now there is no NCY stack offering the template solution.

Some embodiments of the present disclosure provide a general and smart way to implement the ONU template solution reusing an NCY stack implementation and perform the validation on expanded ONU datastore using deviation YANG in an efficient way.

For example, some embodiments of the present disclosure provide a cascading NCY stack to deal with validation for template expanding datastore (e.g. intended datastore in NMDA) and uses the first NCY stack to do the validations for the shared common data in template, while using the second NCY stack to do the validations on expanded datastore for the ONU instance.

In addition, in order to support such huge number of ONU devices in NV, a very strong hardware platform is required, for example, CPU cores and fast memory. According to some embodiments of the present disclosure, there is provided a general and smart way to improve the OMCI calculation performance significantly. For example, according to some embodiments of the present disclosure, the template concept is introduced into virtualized OMCI (vOMCI, which runs in the NV) northbound data, where the vOMCI could calculate the common OMCI data once for all ONU instances, and merge the common OMCI data with ONU-specific OMCI data.

This could be a good extending to the current TR451 since the current TR451 only gives full data for OMCI calculation per ONU instance. In the case, TR451 may be extended. According to some embodiments of the present disclosure, there is provided a new capability of "ONU template based OMCI calculation". With respect to this function, vOMCI may communicate with the virtualized OLT Management Function (vOLTMF), and the vOLTMF then may configure the vOMCI in a vOMCI-supported manner, based on the acquired capability.

Reference now will be made to FIGS. 1A to 10 to describe in detail the principle and implementations of the present disclosure. FIG. 1A illustrates a schematic diagram of an ONU aggregator 100 according to some embodiments of the present disclosure. As shown therein, the ONU aggregator 100 may include an ONU aggregator management function (MF) 110 which may include one or more NCY stacks 111. The one or more NCY stacks 111 may perform ONU data validation.

Figure 1B:
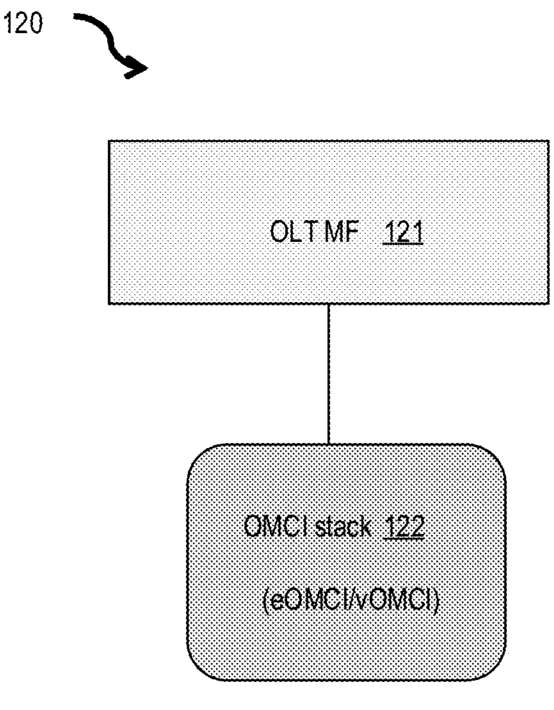
FIG. 1B illustrates a schematic diagram of an OLT function and an OMCI stack according to some embodiments of the present disclosure.

FIG. 1B illustrates a schematic diagram 120 of an OLT function and an OMCI stack according to some embodiments of the present disclosure. As shown in FIG. 1B, an OLT MF 121 may be in communication with an OMCI stack 122 that may include an eOMCI (running on a physical entity) and/or a vOMCI (running in an NV). The OMCI stack 122 may perform OMCI calculation to generate ONU configuration data.

Figure 1C:
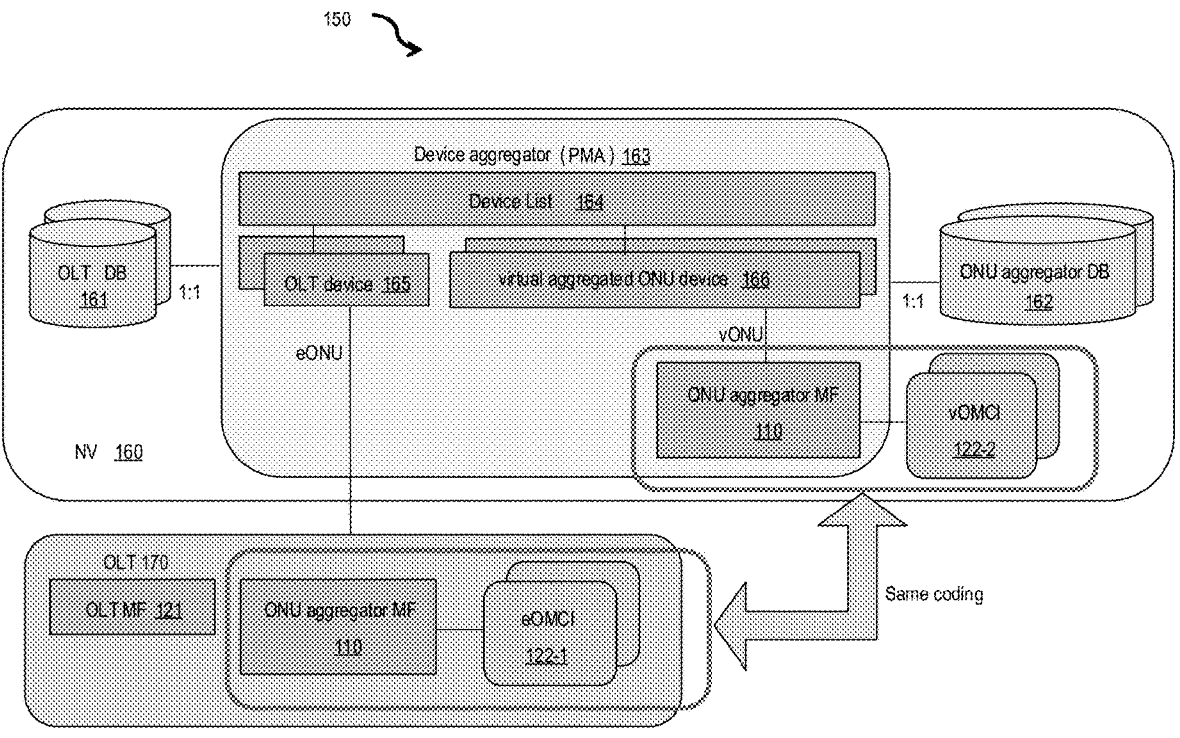
FIG. 1C illustrates a schematic diagram of a network virtualization architecture in which the devices shown in FIGS. 1A and 1B may be applied according to some embodiments of the present disclosure.

FIG. 1C illustrates a schematic diagram of a network virtualization architecture 150 in which the devices shown in FIGS. 1A and 1B may be applied according to some embodiments of the present disclosure. As shown in FIG. 1C, the architecture 150 may include an NV 160 and an OLT 170. The NV 160 may include an OLT DataBase (DB) 161, an ONU aggregator DB 162 and a device aggregator 163 (e.g. Partial Model Aggregation (PMA)). The device aggregator 163 may include a device list 164, an OLT device 165, a virtual aggregated ONU device 166, and the ONU aggregator MF 110 as shown in FIG. 1A. The OLT device 165 may be connected to an entity ONU (eONU), and the virtual aggregated ONU device 166 may be managed and maintained by the ONU aggregator MF 110 via a vOMCI 122-2. The OLT 170 may include an OLT MF 121 as shown in FIG. 1B and an ONU aggregator MF 110 as shown in FIG. 1A, and the OLT 170 may use the eOMCI 122-1 to manage and maintain the eONU via the ONU aggregator MF 110. It would be noted that the vOMCI 122-2 and the eOMCI 122-1 are coded in the same way. The ONU aggregator MF 110 may have therein template expanding datastore and validation for the datastore.

It would be appreciated that the devices and architecture as shown in FIGS. 1A-1C are provided only as examples, without implying any limitation to the scope of the present disclosure. The embodiments of the present disclosure may also be embodied in different devices and architecture. It would also be understood that the devices and the architecture as shown in FIGS. 1A-1C further include other elements or entities for implementing embodiments of the present disclosure. Those network elements or entities may be physical or virtual, which may be implemented in any appropriate manner. In addition, communication between elements or entities may be achieved using any communication technique currently known or to be developed in the future.

Figure 2:
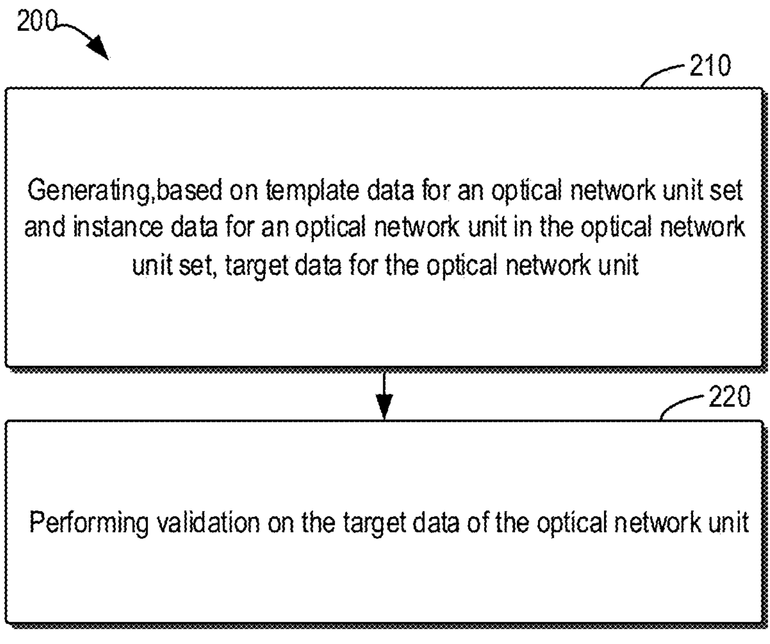
FIG. 2 illustrates a flowchart of an ONU data validation method according to some embodiments of the present disclosure.

FIG. 2 illustrates an ONU data validation method 200 according to some embodiments of the present disclosure. The method 200 may be implemented at the ONU aggregator MF 110 as shown in FIGS. 1A and 1C. It would be appreciated that the method 200 may also be applied to other communication scenarios and devices.

As shown in FIG. 2, at 210, generating, based on template data for an optical network unit set and instance data for an optical network unit in the optical network unit set, target data for the optical network unit. The target data may be, for example, full data for ONU data validation obtained by expanding the template data using the instance data. At 220, performing validation on the target data of the optical network unit.

In some embodiments, before performing the validation, determining whether the template data have been validated previously. If determining the template data have not been validated previously, the template data and instance data in the target data may be validated. If determining the template data have been validated previously, the instance data in the target data may be validated.

In some embodiments, the instance data may be used to expand the template data, to obtain the target data, and the secrete key of the target data is set to be the same as secrete keys of target data of other ONUs in the ONU set. Based on the same secret key, the target data may be used as an update of the template data having been validated previously, to validate the instance data in the target data. After the instance data are validated, the template data may be kept unchanged, so that the template data may be further used in data validation of other ONUs with the same template data. The validation may be performed based on the YANG model.

In this way, according to the embodiments of the present disclosure, there is provided an ONU configuration data validation solution based on template data. The solution may efficiently validate ONU configuration data as it supports the use of template data.

Figure 3:
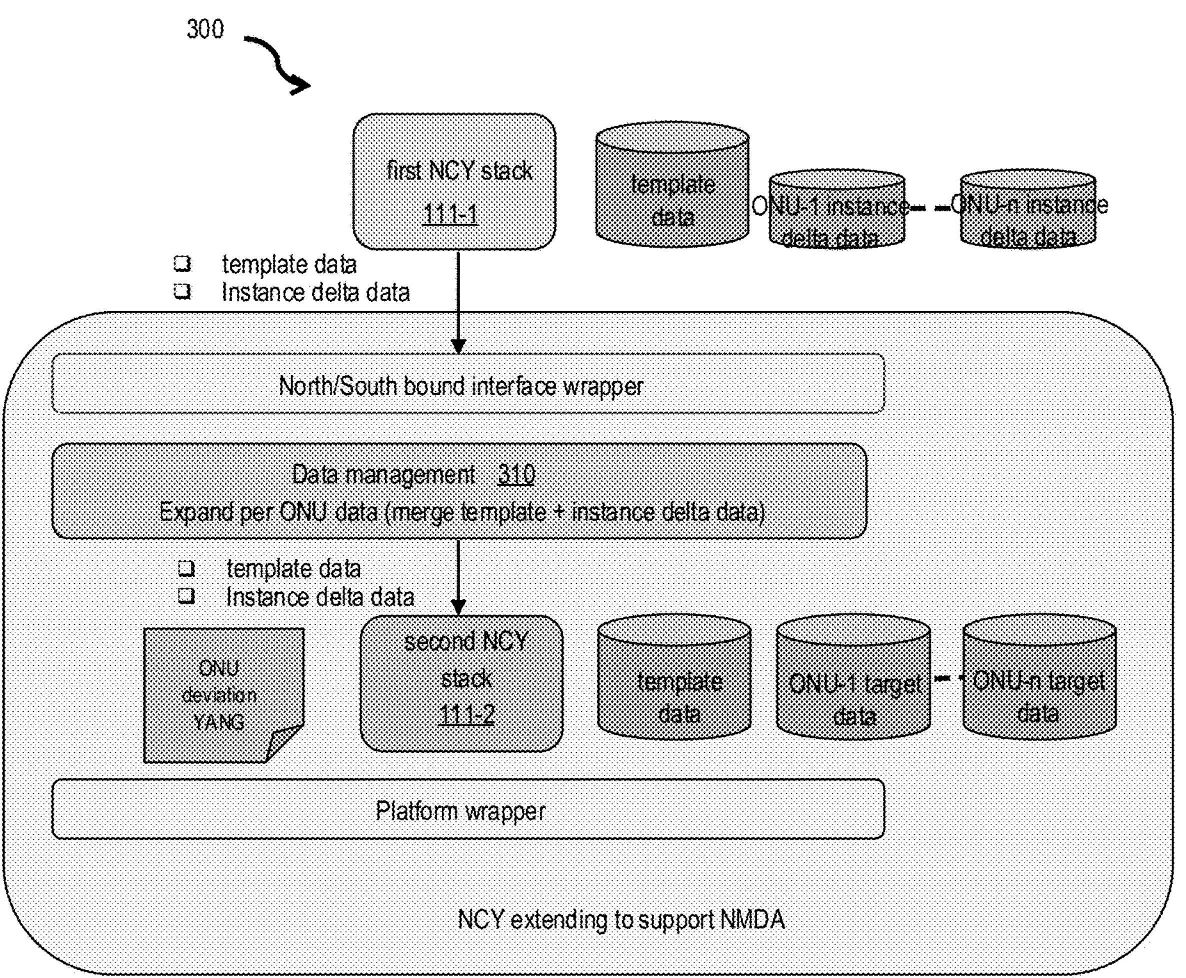
FIG. 3 illustrates a schematic block diagram of an ONU data validation method according to some embodiments of the present disclosure.

FIG. 3 illustrates a schematic block diagram 300 of ONU data validation according to some embodiments of the present disclosure. FIG. 3 may correspond to the ONU aggregator 110 as shown in FIG. 1A. For example, FIG. 3 may involve the first NYC stack 111-1 and the second NCY stack 111-2 in the NCY stacks 111 as shown in FIG. 1A. As shown in FIG. 3, the first NCY stack 111-1 may perform validation on the common template data, or may perform validation on ONU instance delta data relative to the template data. Nevertheless, for ONU data validation, the target data (i.e., the full data obtained by using the ONU instance delta data to expand the template data) also need to be validated. The data management 310 could offer any kind of data, for example, template data, ONU instance delta data, ONU target data, and the like. The second NCY stack 111-2 only need work on the YANG models for ONU device, for example, as required in TR451. The NCY stack functionality itself is agnostic from template concept, only taking all data as ONU instance data.

Therefore, the data management 310 may be used to expand each ONU data, for example, merging the template data with the ONU instance delta data to obtain target data of each ONU. Then, the second NCY stack 111-2 performs validation on the target data using the standard deviation YANG model.

Figure 4:
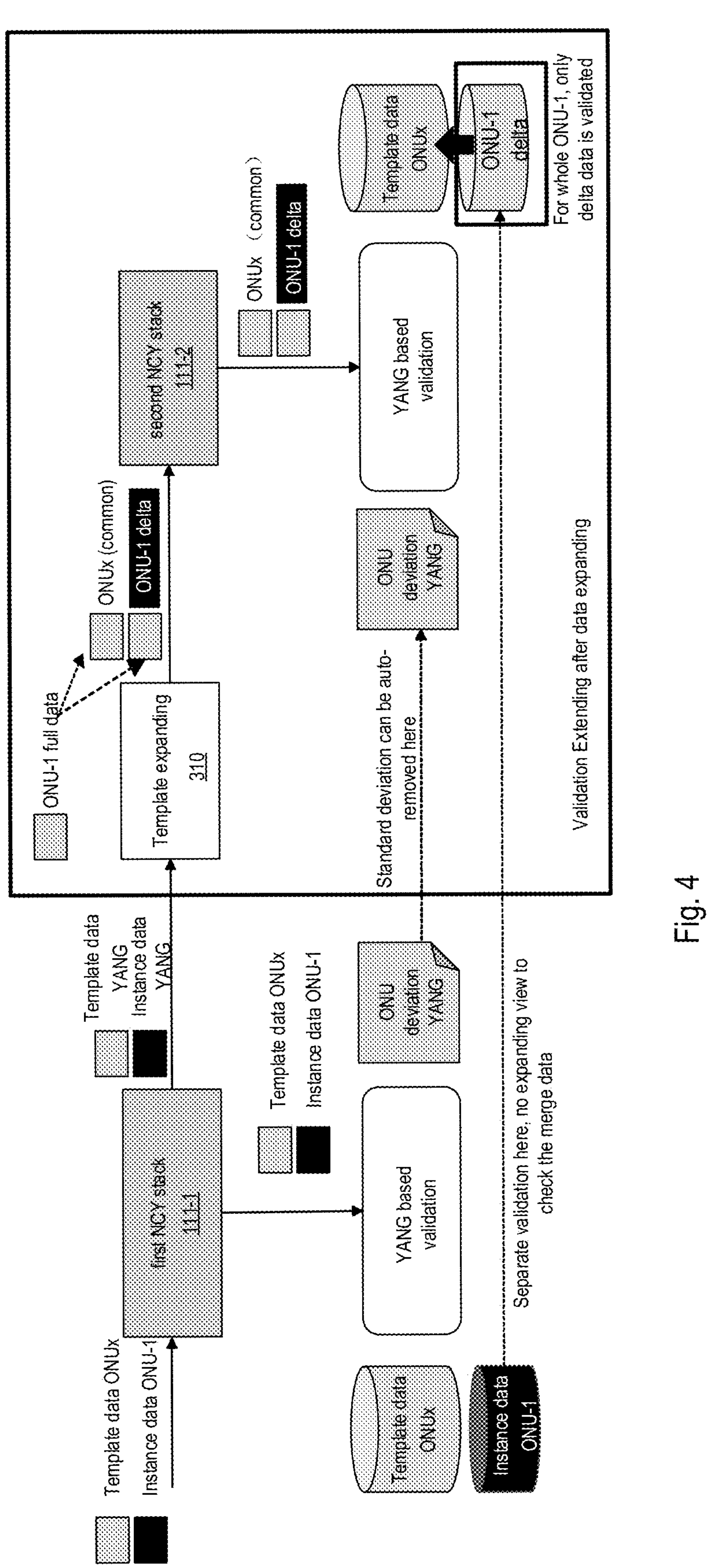
FIG. 4 illustrates a schematic block diagram of a further improved ONU data validation method according to some embodiments of the present disclosure.

Based on the example of FIG. 3, some embodiments of the present disclosure provide a solution supporting ONU data validation based on model data. FIG. 4 illustrates a further improvement to the ONU data validation method as shown in FIG. 3, where the template data are used as running datastore for validating target data of each ONU, which can improve validation performance significantly.

As shown in FIG. 4, the first NCY stack 111-1 may validate the template data and the instance delta data of the ONU-1, respectively, where the template data may be regarded as full data (target data) of an ONUx. Through template expansion (e.g., performed by the data management 310 as shown in FIG. 3), the full data of the ONU-1 may be obtained based on the template data and the instance delta data of the ONU-1, which may include a common part (i.e., the template data) of the full data of the ONUx and the instance delta data of the ONU-1.

Subsequently, the second NCY stack 111-2 may validate the template data as full data of an ONU (e.g. full data of the ONUx), and may perform validation on the ONU-1 using the instance delta data of the ONU-1 as an input for updating the template data. It is worth noting that, after validation, the running datastore (i.e., the template data) may be kept unchanged to be further used in validation of other ONUs with the same template data.

The improved ONU data validation solution provided using the above embodiments can remarkably enhance the validation performance. For example, using a commercial 3rd party NCY server stack to do the test in x86 system, validation full data per ONU instance will require 265 seconds for 1K ONUs, and the improvement will only require 95 seconds. The above test is provided only as an example of the technical effect of the solution according to some embodiments of the present disclosure, which may be varied with vendor deviation, real configuration data, the size of delta data, and the like.

It is to be noted that the second NCY stack 111-2 could also offer the required operational datastore as specified in NMDA RFC8342 with ONU expanding datastore.

For ONU configuration data (e.g. OMCI) calculation, same concept could be used here, relying on shared common data for calculating once common OMCI and applying to related ONU instances OMCI data. For example, some embodiments of the present disclosure introduce the template concept into OMCI calculation to significantly improve the OMCI calculation performance.

Figure 5A:
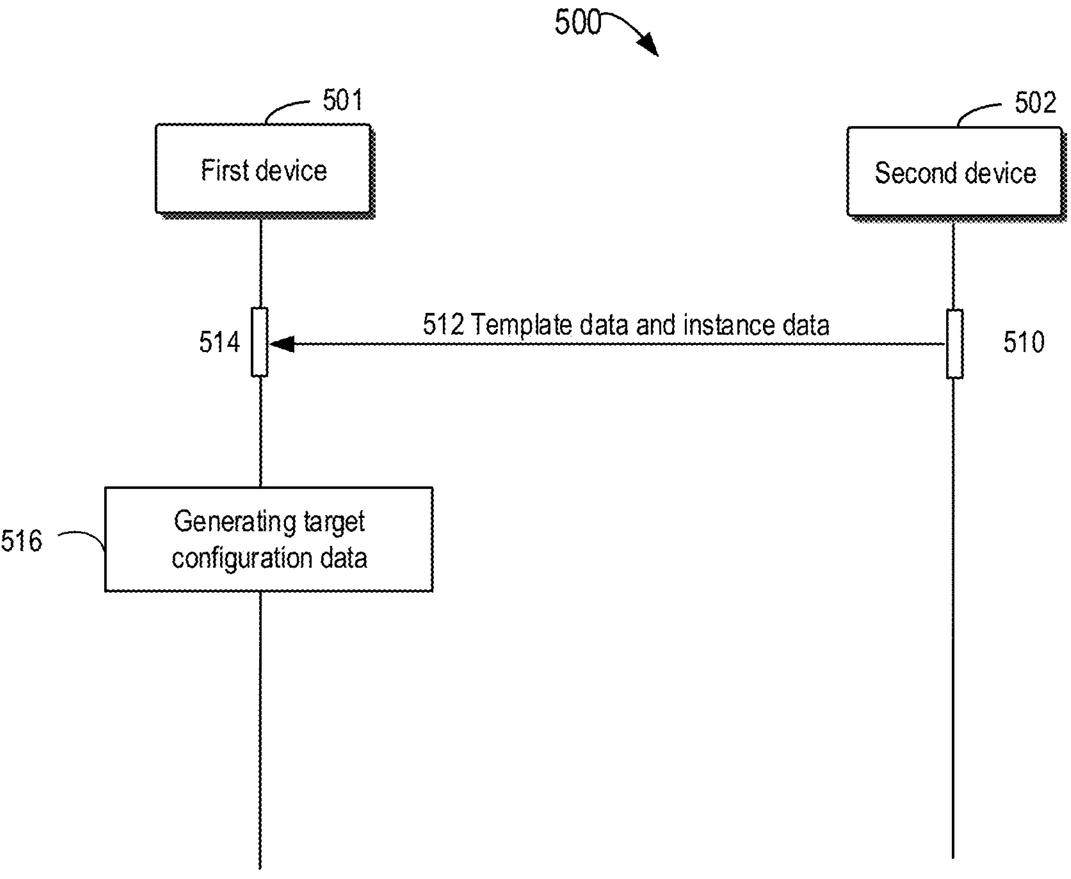
FIGS. 5A and 5B respectively illustrate a signaling diagram of an ONU configuration data calculation process according to some embodiments of the present disclosure.

FIG. 5A illustrates a signalling diagram of an ONU configuration data calculation process 500 according to some embodiments of the present disclosure. The process 500 may involve a first device 501 (e.g., the vMOCI stack 122 as shown in FIG. 1B) and a second device 502 (e.g., the OLT MF 121 as shown in FIGS. 1B and 1C).

As shown in FIG. 5A, the second device 502 may send 510 template data for an optical network unit set and instance data 510 for an optical network unit in the optical network unit set to the first device 501, where the first device 501 receives 514 the template data and the instance data from the second device 502. Target configuration data correspond to target data generated from the template data and the instance data for the optical network unit. The first device 501 may generate 516 target configuration data for the optical network unit, at least based on the template data and the instance data. The target configuration data correspond to the target data generated from the template data and the instance data.

Figure 5B:
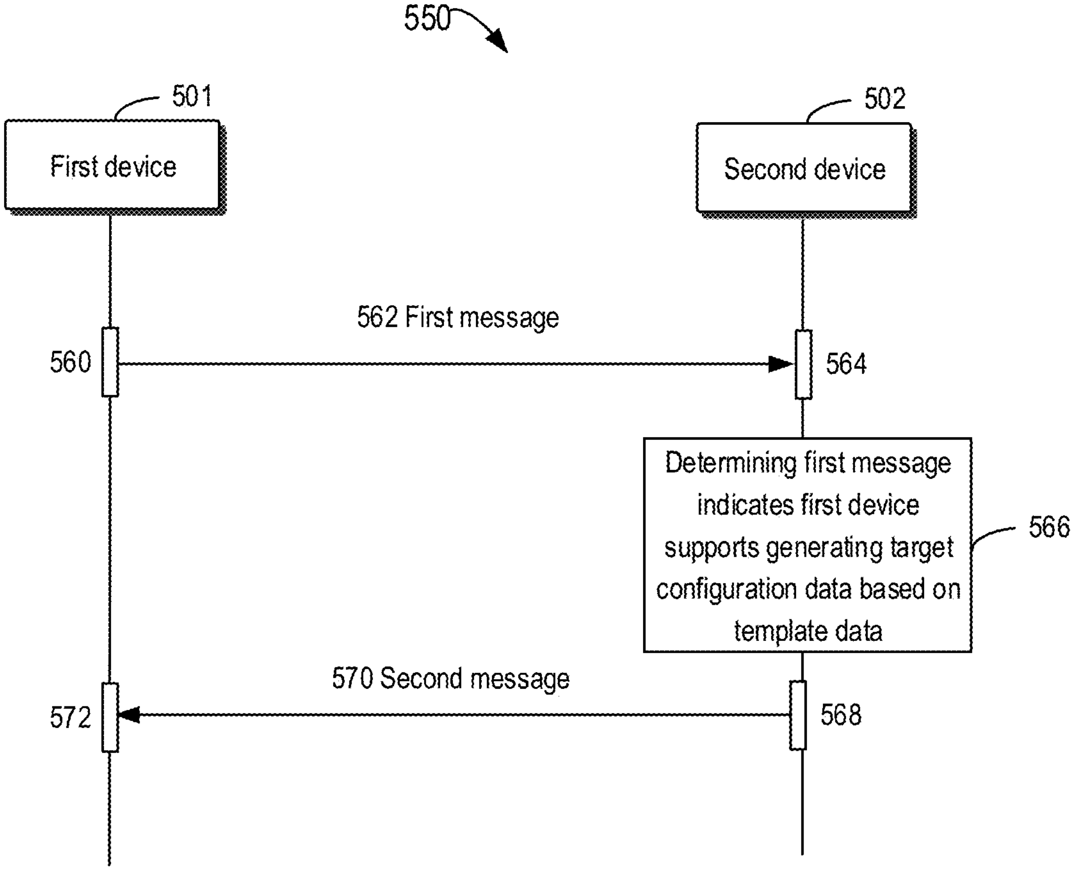

FIG. 5B illustrates a signaling diagram of an ONU configuration data calculation process 550 according to some embodiments of the present disclosure. The process 550 may involve a first device 501 (e.g. the vMOCI stack 122 as shown in FIG. 1B) and the second device 502 (e.g. the OLT MF 121 as shown in FIGS. 1B and 1C).

As shown in FIG. 5B, the first device 510 may send 560 a first message 562 to the second device 501, and the second device 502 may receive 564 the first message 562 from the first device 501. The first message indicates whether the first device 501 supports generating target configuration data for an ONU in an ONU set based on template data for the ONU set, where the target configuration data correspond to target data generated from the template data and instance data for the ONU.

Some embodiments of the present disclosure propose a new capability, which may be named as "ONU template based OMCI calculation" for example. A new item may be used to extend the NFCapability of the emumeration type defined in the TR451 5.7.1.2.1.1 Hello message, which may be, for example, "ONU_TEMPLATE_SUPPORT," to notify the second device 502 (e.g., vOLTMF) whether the first device 501 (e.g., vMOCI function) supports the ONU template based OMCI calculation capability. In some embodiments of the present disclosure, the first message 560 may be an extended Hello message.

If the second device 502 determines 566 that the first message indicates the first device 501 supports generating target configuration data based on template data, the second device 502 sends 567 a second message 570 to the first device 501. The second message 570 may include template data, instance data, and identification information for identifying the template data. The first device 501 receives the second message 570 from the second device 502. If the second device 502 determines that the first message 562 indicates the first device 501 does not support generating target configuration data based on template data, the second device 502 does not send the second message containing the template data to the first device 501.

For example, if the ONU template based OMCI calculation capability is supported, according to some embodiments of the present disclosure, "bytes delta_config" in "message UpdateConfigInstance" defined in TR451 can be extended, to identify whether bytes delta_config is related to the template.

Figure 6:
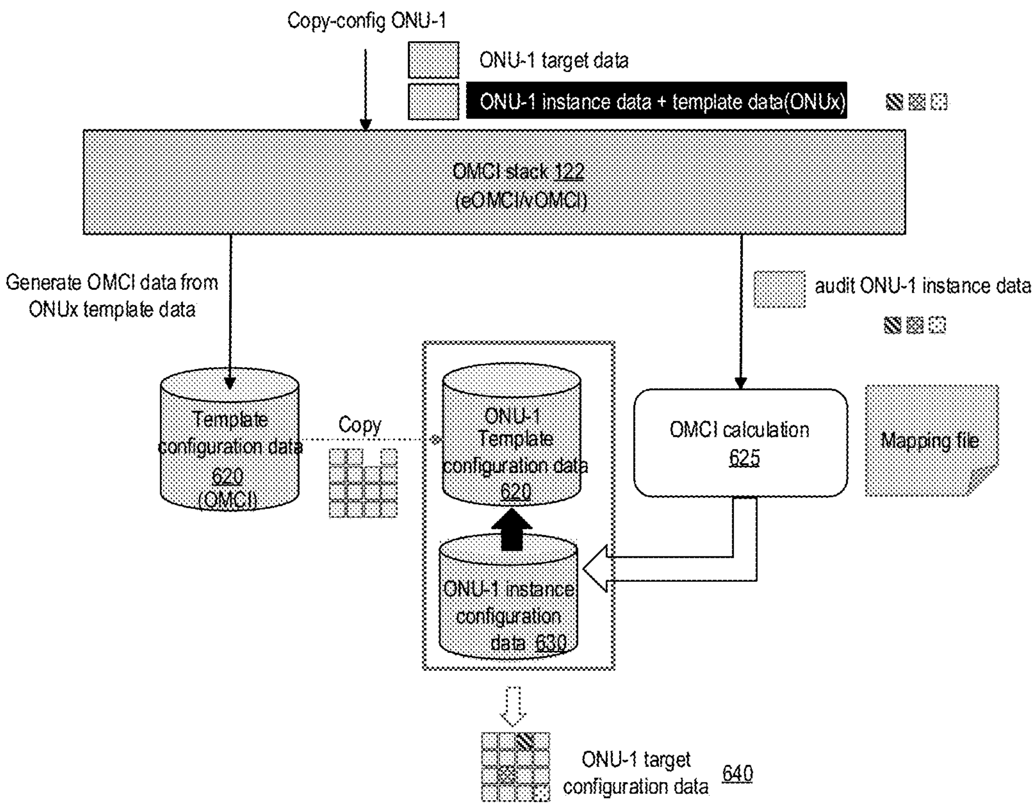
FIG. 6 illustrates a schematic block diagram of ONU configuration data calculation according to some embodiments of the present disclosure.

FIG. 6 illustrates a schematic block diagram of ONU configuration data calculation according to some embodiments of the present disclosure. FIG. 6 may involve the OMCI stack 122 as shown in FIG. 1B. As shown in FIG. 6, instance data of the ONU-1 and the template data (e.g. template data regarded as full data of an ONUx) are input into the OMCI stack 122 (e.g. the eOMCI 122-1 and/or the eOMCI 122-2 as shown in FIG. 1C). The OMCI stack 122 may generate template configuration data 620 for the ONU-1 based on the template data, and generate ONU-1 instance configuration data 630 through OMCI calculation 625 based on ONU-1 instance data. Then, target configuration data 640 is generated based on the template configuration data 620 and the instance configuration data 630. For example, merging the template configuration data 620 with the instance configuration data 630, and using the instance configuration data 630 to cover an overlapping data portion of the two, to generate the target configuration data 640.

In some embodiments, the target data (e.g. full data) of the ONU-1 is also input to the OMCI stack 122. If template configuration data have not been generated previously based on the template data, the OMCI stack 122 may generate the target configuration data 640 based on the target data of the ONU-1.

The main technical challenge of the template based OMCI calculation solution is to identify delta OMCI data in the instance specific YANG configuration. Some embodiments of the present disclosure reconstruct complete OMCI dependencies based on delta YANG, and all the objects found in the dependencies are recalculated and merged with the common OMCI data.

With the ONU configuration data calculation solution provided by the above embodiments, the ONU configuration data calculation performance may be improved significantly. For example, using two typical hardware platforms to validate results: one is a legacy motherboard mainly deployed in the site and equipped with a low-end CPU, and the other is a newly produced motherboard equipped with a higher CPU. The test where a classic service database (typical deployment data) is used shows that: for the legacy motherboard, the solution provided by embodiments of the present disclosure could increase CPU processing resources by about 40%, and 30-40 MB of the memory when a 1K ONU is configured; for the new motherboard, the solution provided by embodiments of the present disclosure could increase the CPU processing resources by about 27%, and save about 30 MB of the memory when a 2K ONU is configured. In the vOMCI, since hundreds of thousands of ONUs are to be processed, the resources saving will be huge. The above test is only an example of the technical effects of some embodiments of the present disclosure.

Figure 7:
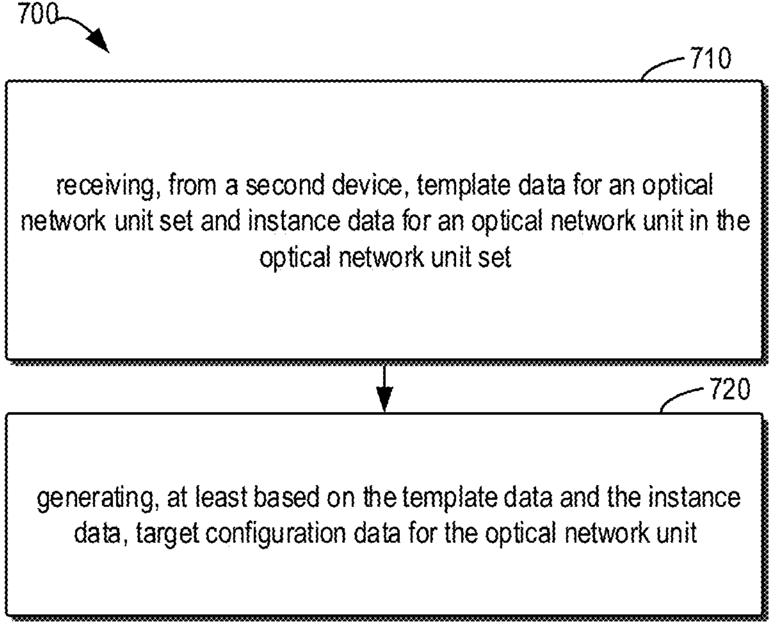
FIG. 7 illustrates a flowchart of an ONU configuration data calculation method implemented at a first device according to some embodiments of the present disclosure.

FIG. 7 illustrates a flowchart of an ONU configuration data calculation method 700 implemented at a first device according to some embodiments of the present disclosure. For discussion purposes, FIG. 7 will be described with reference to FIGS. 1B, 1C, 5A and 6. For example, the method 700 may involve the first device 501 and the second device 502 as shown in FIG. 5A.

At 710, the first device 501 receives, from the second device 502, template data for an optical network unit set and instance data for an optical network unit in the optical network unit set. At 720, the first device 501 generates, at least based on the template data and the instance data, target configuration data for the optical network unit. The target configuration data correspond to target data generated from the template data and the instance data.

In some embodiments, before generating the target configuration data, the first device 501 may receive target data from the second device 502. In some embodiments, before generating the target configuration data, the first device 501 may determine whether the template configuration data have been generated previously based on the template data. The first device 501 may generate target configuration data based on target data based on determining that the template configuration data have not been generated previously. Alternatively, based on determining that the template configuration data have been generated previously, the first device 501 may generate instance configuration data based on the instance data, and generate the target configuration data based on the template configuration data and the instance configuration data.

In some embodiments, the first device 501 may send a first message to the second device 502, where the first message indicates whether the first device 501 supports generating the target configuration data based on the template data. In some embodiments, the first device 501 may receive a second message from the second device 502, where the second message includes the template data, the instance data and identification information for identifying the template data.

In some embodiments, the template data, the instance data and the target data are YANG model-based data, and the configuration data, the template configuration data and the instance configuration data are OMCI data. In some embodiments, the first device 501 includes an OMCI function, and the second device 502 includes an OLTMF.

FIG. 8 illustrates a flowchart of an ONU configuration data calculation method 800 implemented at a second device according to some embodiments of the present disclosure. For discussion purpose, FIG. 8 will be described with reference to FIGS. 1A, 1C, 5B and 6. For example, the method 800 may involve the first device 501 and the second device 502 as shown in FIG. 5B.

At 810, the second device 502 receives a first message from the first device 501, where the first message indicates whether the first device supports generating target configuration data for an optical network unit in the optical network unit set based on template data for an optical network unit set. The target configuration data correspond to target data generated from the template data and instance data for the optical network unit.

At 820, the second device 502 sends a second message to the first device 501 based on determining that the first message indicates the first device supports generating the target configuration data based on the template data, where the second message includes the template data, the instance data, and identification information for identifying the template data.

In some embodiments, after receiving the first message, the second device 502 may send the target data to the first device 501. In some embodiments, the template data, the instance data and the target data are YANG model-based data. In some embodiments, the first device 501 includes an OMCI function, and the second device 502 includes an OLTMF.

In some example embodiments, the method 200 described above with reference to FIG. 2 can be performed by means for performing respective steps of the method 200. Those means may be implemented in any appropriate form. For example, the means may be implemented in a circuitry or software module.

In some embodiments, an apparatus includes means for performing operations of: generating target data for the optical network unit based on template data for an optical network unit set and instance data for an optical network unit in the optical network unit set; and performing validation on the target data of the optical network unit.

In some embodiments, the apparatus further includes means for performing operations of: before performing the validation, determining whether the template data have been validated previously. In some embodiments, the component for performing the validation includes a component for performing an operation of: validating the template data and the instance data in the target data, based on determining that the template data have not been validated previously. In some embodiments, the component for performing the validation includes a component for performing an operation of: validating the instance data in the target data, based on determining that the template data have been validated previously.

In some embodiments, the component for generating the target data includes means for performing operations of: expanding the template data using the instance data, to obtain the target data; and setting a secrete key of the target data to be the same as secrete keys of target data of other optical network units in the optical network unit set. In some embodiments, the component for performing the validation include means for performing operations of: based on the same secrete key, using the target data as an update of the template data having been validated previously, to validate the instance data in the target data; and after validating the instance data, keeping the template data unchanged. In some embodiments, the validation may be performed based on another next generation (YANG) model.

In some embodiments, the apparatus further includes an apparatus for performing other steps of the method 200 according to some embodiments. In some embodiments, the apparatus includes at least one processor; and at least one memory including computer program code, where the at least one memory and the computer program code are configured, with the at least one processor, to cause the apparatus to perform operations.

In some embodiments, the method 700 described above with reference to FIG. 7 may be performed by means for performing respective steps of the method 700. Those means may be implemented in any appropriate form. For example, the means may be implemented in a circuitry or software module.

In some embodiments, an apparatus includes means for performing operations of: receiving template data for an optical network unit set and instance data for an optical network unit in the optical network unit set from a second device; and generating target configuration data for the optical network unit at least based on the template data and the instance data, where the target configuration data correspond to target data generated from the template data and the instance data.

In some embodiments, the apparatus further includes a component for performing an operation of: before generating the target configuration data, receiving the target data from the second device. In some embodiments, the apparatus further includes a component for performing an operation of: before generating the target configuration data, determining whether template configuration data have been generated previously based on the template data.

In some embodiments, the component for generating the configuration data includes a component for performing an operation of: generating the target configuration data based on the target data, based on determining that the template configuration data have not been generated previously. In some embodiments, the component for generating the configuration data includes means for performing operations of: based on determining that the template configuration data have been generated previously, generating instance configuration data based on the instance data; and generating the target configuration data, based on the template configuration data and the instance configuration data.

In some embodiments, the apparatus further includes a component for performing an operation of: sending a first message to the second device, where the first message indicates whether the first device supports generating the target configuration data based on the template data.

In some embodiments, the component for receiving the template data and the instance data from the second device, includes a component for performing an operation of: receiving a second message from the second device, where the second message includes the template data, the instance data and identification information for identifying the template data.

In some embodiments, the template data, the instance data and the target data are data based on another next generation (YANG) model, and the configuration data, the template configuration data and the instance configuration data are Optical Network Unit Management and Control Interface (OMCI) data. In some embodiments, the first device includes an OMCI function, and the second device includes an Optical Line Terminal (OLT) management function.

In some embodiments, the apparatus further includes an apparatus for performing other steps of the method 700 according to some embodiments. In some embodiments, the apparatus includes at least one processor; and at least one memory including computer program code, where the at least one memory and the computer program code are configured, with the at least one processor, to cause the apparatus to perform operations.

In some embodiments, the method 800 described above with reference to FIG. 8 can be performed by means for performing respective steps of the method 800. Those means may be implemented in any appropriate form. For example, the means may be implemented in a circuitry or software module.

In some embodiments, an apparatus includes means for performing operations of: receiving a first message from a first device, where the first message indicates whether the first device supports generating target configuration data for an optical network unit in the optical network unit set, based on template data for an optical network unit set, and the target configuration data correspond to target data generated from the template data and instance data for the optical network unit; and sending a second message to the first device, based on determining that the first message indicates the first device supports generating the target configuration data based on the template data, where the second message includes the template data, the instance data, and identification information for identifying the template data.

In some embodiments, the apparatus further includes a component for performing an operation of after receiving the first message, sending the target data to the first device. In some embodiments, the template data, the instance data and the target data are data based on another next generation (YANG) model. In some embodiments, the first device includes an Optical Network Unit Management and Control Interface (OMCI) function, and the second device includes an Optical Line Terminal (OLT) management function.

In some embodiments, the apparatus further includes means for performing other steps of the method 800 according to some embodiments. In some embodiments, the apparatus includes at least one processor; and at least one memory including computer program code, where the at least one memory and the computer program code are configured, with the at least one processor, to cause the apparatus to perform operations.

Figure 9:
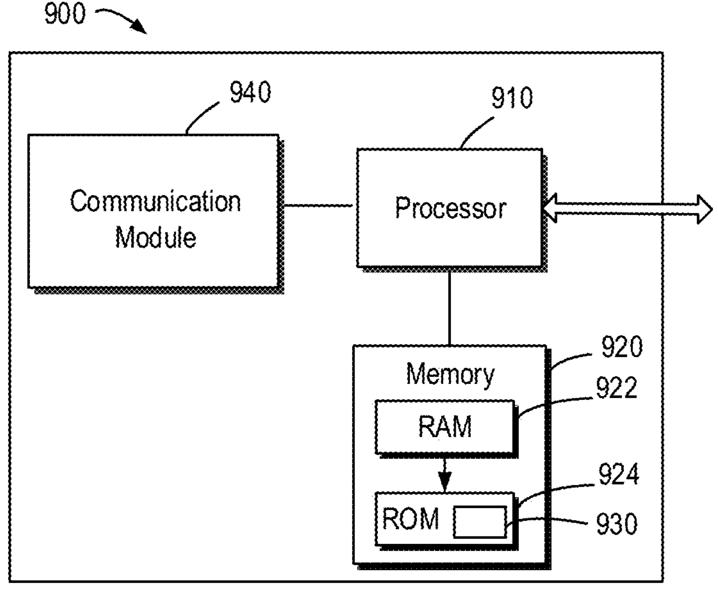
FIG. 9 illustrates a block diagram of a device adapted to implement some embodiments of the present disclosure.

FIG. 9 illustrates a block diagram of a device 900 adapted to implement embodiments of the present disclosure. The device 900 may be implemented in the ONU aggregator MF 110, the NCY stack 111, the OLT MF 121 and the OMCI stack 122 as shown in FIGS. 1A-1C, or a part of the first device 501 or the second device 502 as shown in FIGS. 5A and 5B. As shown in FIG. 9, the device 900 includes at least one processor 910, at least one memory 920 coupled to the processor 910, a communication module 940 coupled to the processor 910 and a communication interface (not shown) coupled to the communication module 940. The memory 920 at least stores a computer program 930.

The communication module 940 is used for two-way communication. The communication module 940 includes at least one antenna for promote communication. The communication interface may indicate any interface necessary for communication.

The processor 910 may execute instructions to cause the device 900 to perform the related operations and features as described above with reference to FIGS. 1-8. By way of example, the apparatus may perform the ONU configuration data calculation process on the first device 501 by executing instructions. All the features described above with reference to FIGS. 1-8 are applicable to the device 900, details of which are omitted here.

The processor 910 may be of any appropriate type adapted to the local technical environment, and may include one or more of the following: a general-purpose computer, a special-purpose computer, a microprocessor, a Digital Signal Processor (DSP) and a multi-core processor architecture-based processor. The device 900 may include a plurality of processors, for example, an application-specific integrated circuit chip that is temporally slave to a clock synchronized with the host processor.

The memory 920 may include one or more non-volatile memories and one or more volatile memories. Examples of the non-volatile memory include, but are not limited to: a Read-Only Memory (ROM) 924, an Electrically Programmable Read-Only Memory (EPROM), a flash memory, a hard drive, a Compact Disc (CD), a Digital Video Disc (DVD), and other magnetic storage device and/or optical storage device. Examples of the volatile memory include, but are not limited to: a Random Access Memory (RAM) 922 and other volatile memory not maintained during a power outage.

The computer program 930 includes computer executable instructions executed by the associated processor 910. The program 930 may be stored in the ROM 924. The processor may perform any appropriate act and processing by loading the program 930 into the RAM 922.

The embodiments of the present disclosure can be implemented by the program 930, and the device 900 can perform any process as discussed herein with reference to FIGS. 1A-8. The example embodiments of the present disclosure can also be implemented by hardware or a combination of software and hardware.

Figure 10:
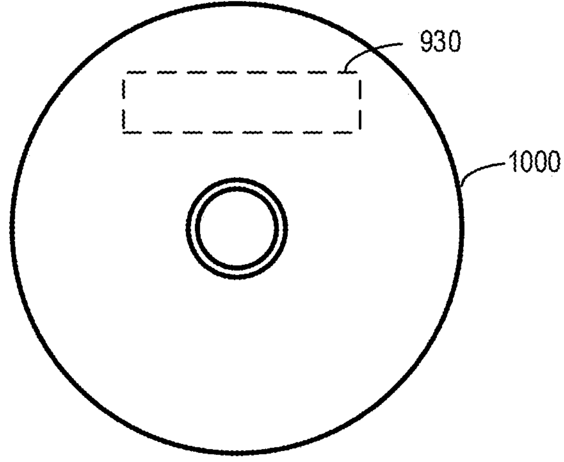
FIG. 10 illustrates a block diagram of an example computer-readable medium according to some embodiments of the present disclosure.

In some example embodiments, the program 930 can be tangibly contained in a computer-readable medium that may be included in the device 900 (e.g. the memory 920) or other storage device accessible by the device 900. The device 900 can load the program 930 from the computer-readable medium into the RAM 922 for execution. The computer-readable medium may include any type of tangible non-volatile memory such as a ROM, an EPROM, a flash memory, a hard drive, a CD, a DVD and the like. FIG. 10 illustrates an example of a computer-readable medium 1000 in the form of CD or DVD. The computer-readable medium has the program 930 stored thereon.

In general, various example embodiments of the present disclosure can be implemented in hardware or special purpose circuitry, software, logic, or any combination thereof. Some aspects may be implemented in hardware while some other aspects may be implemented by a controller, a microprocessor, or firmware or software executed by other computing device. When the respective aspects of the embodiments of the present disclosure are shown or depicted in block diagrams, flowcharts or using some other graphical representations, it would be appreciated that the blocks, devices, systems, techniques or methods described herein can be implemented, as non-limiting examples, in hardware, software, firmware, special purpose circuitry or logic, general purpose hardware or controllers or other computer devices, or some combinations thereof.

The present disclosure further provides at least one computer program product tangibly stored on a non-transient computer-readable storage medium. The computer program product includes computer executable instructions, for example, those stored in the program module and executed in a target real or virtual processor to implement the methods as described above with reference to FIGS. 2, 4 and 5. Generally, the program module includes a routine, program, library, object, class, component, data structure and the like, which executes a particular task or implement a particular abstract data structure. In various example embodiments, the functions of the program modules can be merged or split among the program modules described herein. A computer executable instruction for a program module can be executed locally or within a distributed device. In a distributed device, a program module can be located in both of a local and a remote storage medium.

Computer program code for carrying out methods of the present disclosure may be written in any combination of one or more programming languages. The program code may be provided to a processor of a general purpose computer, special purpose computer, or other programmable data processing apparatus, such that the program code, when executed by the processor or controller, causes the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, computer program code or related data can be carried by any appropriate carrier, such as a device, apparatus or processor can execute various processing and operations as described above. The example of the carrier includes a signal, a computer-readable medium and the like.

The example of the signal can include a signal broadcast electrically, optically, wirelessly, acoustically or in other forms, such as a carrier, an infrared signal and the like.

The computer-readable medium may be a computer-readable signal medium or a computer-readable storage medium. A computer-readable medium may include but not limited to an electronic, magnetic, optical, electromagnetic, infrared, or semiconductor system, apparatus or device, or any suitable combination of the foregoing. More specific examples of the computer-readable readable storage medium would include an electrical connection having one or more wires, a portable computer diskette, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the present disclosure has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A device for communication, comprising:

at least one processor; and at least one memory having instructions stored therein which, when executed, causes the device at least to:

generate, based on template data for an optical network unit set and instance data for an optical network unit in the optical network unit set, target data for the optical network unit; and perform validation on the target data of the optical network unit based on another next generation (YANG) model.

2. The device of claim 1, wherein the device is further caused to:

determine, before performing the validation, whether the template data have been validated previously.

3. The device of claim 2, wherein the device is caused to perform the validation in the following manner:

validating, based on determining that the template data have not been validated previously, the template data and the instance data in the target data.

4. The device of claim 2, wherein the device is caused to perform the validation in the following manner:

validating, based on determining that the template data have been validated previously, the instance data in the target data.

5. The device of claim 1, wherein the device is caused to generate the target data in the following manner:

expanding the template data using the instance data, to obtain the target data; and setting a secrete key of the target data to be the same as secrete keys of target data of other optical network units in the optical network unit set.

6. The device of claim 5, wherein the device is caused to perform the validation in the following manner:

using, based on the same secrete key, the target data as an update of the template data having been validated previously, to validate the instance data in the target data; and keeping, after validating the instance data, the template data unchanged.

7. A first device for communication, comprising:

at least one processor; and at least one memory having instructions stored therein which, when executed, causes the first device at least to:

receive, from a second device, template data for an optical network unit set and instance data for an optical network unit in the optical network unit set; and generate, at least based on the template data and the instance data, target configuration data for the optical network unit, the target configuration data correspond to target data generated from the template data and the instance data;

wherein the template data, the instance data and the target data are data based on another next generation (YANG) model, and the configuration data, the template configuration data and the instance configuration data are Optical Network Unit Management and Control Interface (OMCI) data; wherein the first device comprises an OMCI function, and the second device comprises an Optical Line Terminal (OLT) management function.

8. The first device of claim 7, wherein the first device is further caused to:

receive, before generating the target configuration data, the target data from the second device.

9. The first device of claim 8, wherein the first device is further caused to:

determine, before generating the target configuration data, whether template configuration data have been generated previously based on the template data.

10. The first device of claim 9, wherein the first device is caused to generate the configuration data in the following manner:

generating, based on determining that the template configuration data have not been generated previously, the target configuration data based on the target data.

11. The first device of claim 9, wherein the first device is caused to generate the configuration data in the following manner:

generating, based on determining that the template configuration data have been generated previously, instance configuration data based on the instance data; and generating, based on the template configuration data and the instance configuration data, the target configuration data.

12. The first device of claim 7, wherein the first device is further caused to:

send a first message to the second device, the first message indicates whether the first device supports generating the target configuration data based on the template data.

13. The first device of claim 7, wherein the first device is caused to receive the template data and the instance data from the second device in the following manner:

receiving a second message from the second device, the second message comprises the template data, the instance data and identification information for identifying the template data.

14. A second device for communication, comprising:

at least one processor; and at least one memory having instructions stored therein which, when executed, causes the second device at least to:

receive a first message from a first device, the first message indicates whether the first device supports generating target configuration data for an optical network unit in an optical network unit set based on template data for the optical network unit set, the target configuration data correspond to target data generated from the template data and instance data for the optical network unit; and send a second message to the first device based on determining that the first message indicates the first device supports generating the target configuration data based on the template data, the second message comprises the template data, the instance data, and identification information for identifying the template data;

wherein the template data, the instance data and the target data are data based on another next generation (YANG) model; wherein the first device comprises an Optical Network Unit Management and Control Interface (OMCI) function, and the second device comprises an Optical Line Terminal (OLT) management function.

15. The second device of claim 14, wherein the second device is further caused to:

send, after receiving the first message, the target data to the first device.

* * * * *